United States Patent [19]
Reed et al.

[11] Patent Number: 6,023,386
[45] Date of Patent: Feb. 8, 2000

[54] FAULT TOLERANT SYNC MARK DETECTOR FOR SYNCHRONIZING A TIME VARYING SEQUENCE DETECTOR IN A SAMPLED AMPLITUDE READ CHANNEL

[75] Inventors: David E. Reed, Westminster; William G. Bliss, Thornton, both of Colo.

[73] Assignee: Cirrus Logic, Inc., Fremont, Calif.

[21] Appl. No.: 08/961,727

[22] Filed: Oct. 31, 1997

[51] Int. Cl.[7] .................................................... G11B 5/09
[52] U.S. Cl. .............................................. 360/51; 360/46
[58] Field of Search ................................. 360/46, 51, 65

[56] References Cited

U.S. PATENT DOCUMENTS

| | | |
|---|---|---|
| 5,231,545 | 7/1993 | Gold . |
| 5,260,976 | 11/1993 | Dolivo et al. . |
| 5,448,571 | 9/1995 | Hong et al. . |
| 5,502,408 | 3/1996 | Scholz . |
| 5,668,678 | 9/1997 | Reed et al. ................................ 360/51 |
| 5,729,396 | 3/1998 | Dudley et al. ............................ 360/51 |
| 5,793,548 | 8/1998 | Zook ........................................ 360/51 |

OTHER PUBLICATIONS

Edward A. Lee, David G. Messerchmitt, "Timing Recovery", *Digital Communications*, Kluwer Academic Publishers, Boston, 1988, Chapter 15, pp. 560–585.
U.S. application No. 08/440,268 Dudley et al. May 12, 1995.
U.S. application No. 08/533,797 Zook Sep. 26, 1995.

*Primary Examiner*—W. Chris Kim
*Attorney, Agent, or Firm*—Howard H. Sheerin; Dan Shifrin

[57] ABSTRACT

In a magnetic disk storage system, a sampled amplitude read channel is disclosed that employs a fault tolerant sync mark detector for detecting a sync mark from the channel samples in order to synchronize a time varying sequence detector. The read channel preferably employs PR4 equalization for timing recovery and gain control, and EEPR4 equalization for sequence detection. The EEPR4 sequence detector operates according to a time varying state machine matched to a predetermined trellis code constraint. Because the state machine is time varying, the data stream must be synchronized at the input of the sequence detector rather than at the output as in the prior art. The present invention provides a fault tolerant sync mark detector that detects a sync mark from the EEPR4 channel samples before being input into the sequence detector. In one embodiment, the sync mark detector accumulates a squared error between the read signal sample values and the target sample values of the target sync mark; the sync mark is detected when the accumulated squared error is less than a predetermined lower threshold. In an alternative embodiment, the sync mark detector computes a correlation between the read signal sample values and the target sample values of the target sync mark; the sync mark is detected when the correlation is greater than a predetermined upper threshold. The correlation sync mark detector is the preferred embodiment because it is insensitive to d.c. offsets, it exhibits excellent performance in detecting short sync marks, and it can be implemented as two cascaded finite impulse response filters without requiring multipliers or squarers.

30 Claims, 13 Drawing Sheets

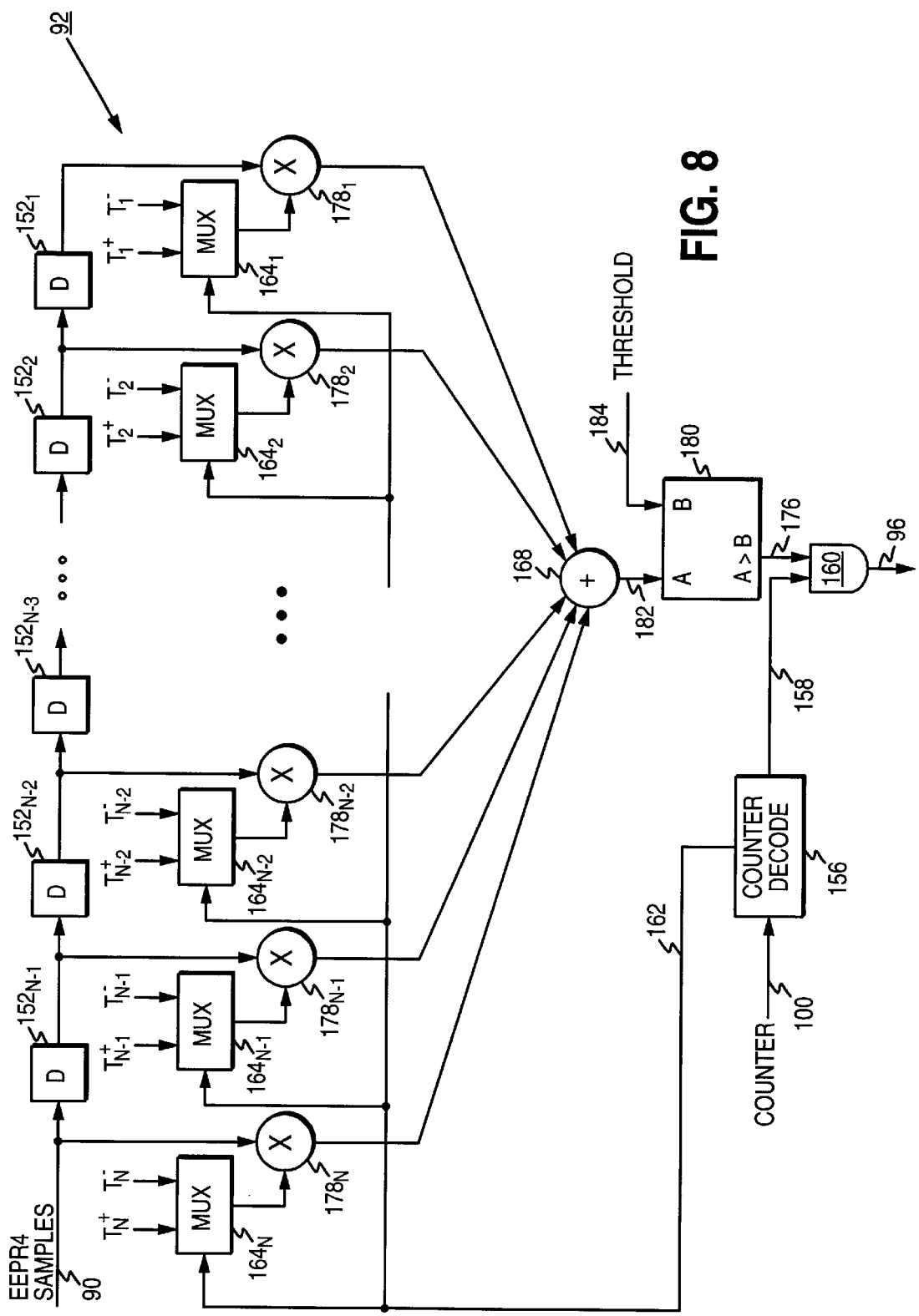

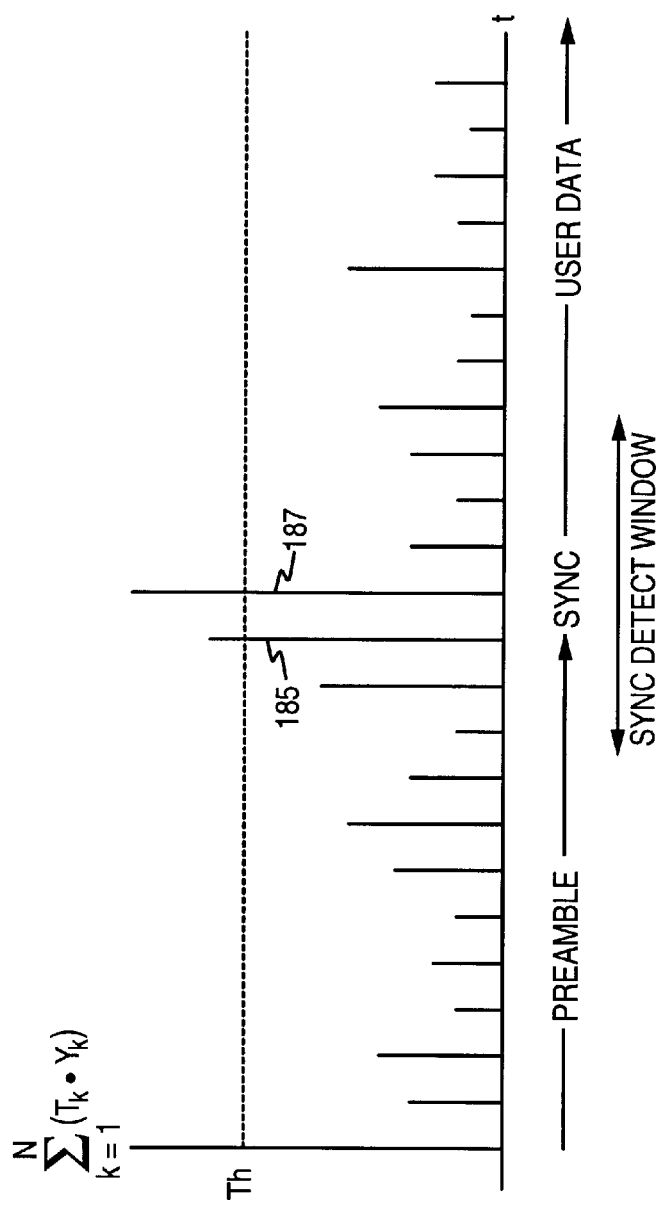
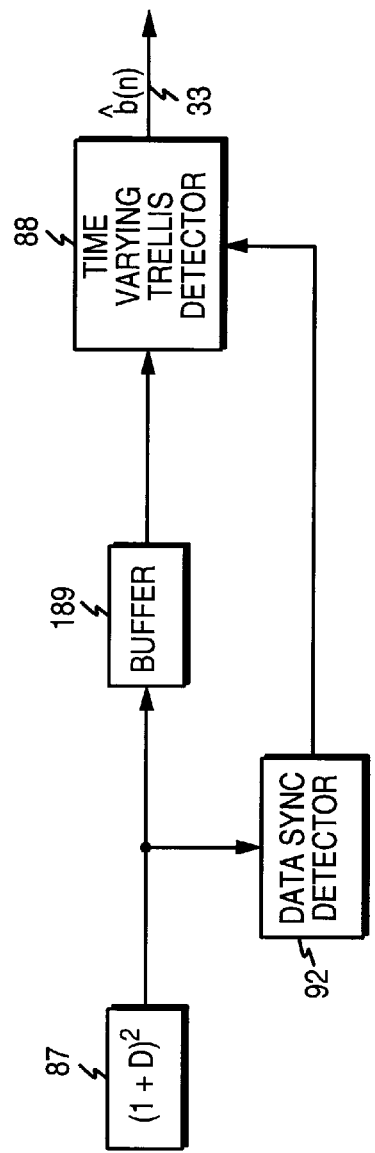
FIG. 9A
FIG. 9B

FAULT TOLERANT SYNC MARK DETECTOR FOR SYNCHRONIZING A TIME VARYING SEQUENCE DETECTOR IN A SAMPLED AMPLITUDE READ CHANNEL

CROSS REFERENCE TO RELATED APPLICATIONS AND PATENTS

This application is related to other co-pending U.S. patent applications, namely application Ser. Nos. 08/751,880 entitled "ZERO PHASE RESTART FOR INTERPOLATED TIMING RECOVERY IN A SAMPLED AMPLITUDE READ CHANNEL," 08/533,797 entitled "FAULT TOLERANT SYNC MARK DETECTOR FOR COMPARING A SIGN AND MAGNITUDE OF A DETETECTED RECORDING," and 08/815,881 entitled "TRELLIS CODING SYSTEM FOR DISC STORAGE SYSTEMS." This application is also related to U.S. Pat. No. 5,668,678 entitled "DETECTING SERVO DATA AND SERVO BURSTS FROM DISCRETE TIME SAMPLES OF AN ANALOG READ SIGNAL IN A SAMPLED AMPLITUDE READ CHANNEL." The above U.S. patent and patent applications are assigned to the same entity, and all are incorporated herein by reference.

FIELD OF INVENTION

The present invention relates to the control of magnetic storage systems for digital computers, particularly to a sampled amplitude read channel incorporating a fault tolerant sync mark detector for detecting a sync mark from channel samples in order to synchronize a time varying sequence detector.

BACKGROUND OF THE INVENTION

Computer systems typically store digital data on a rotating magnetic disk by manipulating the magnetic flux properties on the surface of the disk. Typically, during a write operation the digital data serve to modulate the current in a solenoid (coil) of a magnetic read/write head wherein a "0" bit induces current in a positive direction and a "1" bit induces current in a negative direction. The current passing through the coil generates a corresponding positive or negative magnetic field that magnetizes the surface of the disk in a forward or reverse direction as the disk spins underneath the write head. Because the magnetization of the disk's surface is hysteretic, the magnetic transitions that represent the digital data remain when the magnetic field from the head is removed. Consequently the digital data is stored on the disk even when the storage system is powered down. To read the stored digital data, the read/write head is again positioned over the disk's surface and, as the magnetic transitions pass under the head, the changing magnetic field induces a positive or negative current in the coil of the read/write head. The polarity and strength of the current (or voltage when passed through a resistor) induce pulses in an analog read signal which are detected and decoded into an estimated digital sequence. In the absence of errors, the estimated digital sequence will be the originally recorded digital sequence.

Detecting and decoding the pulses into an estimated digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to channel noise. As a result, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry responsive to threshold crossing or derivative information detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit (i.e., NRZI recording). The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference (ISI), a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits.

Sampled amplitude detection, such as partial response (PR) with Viterbi detection, allows for increased data density by compensating for intersymbol interference. In other words, sampled amplitude read channels can tolerate a controlled amount of ISI, thereby allowing an increase in the linear bit density while maintaining an arbitrary low bit error rate. Unlike conventional peak detection systems, sampled amplitude recording detects digital data by interpreting, at discrete time instances, the actual value of the pulse data. The analog pulses are sampled at the baud rate (code bit rate) and the digital data is detected from these discrete time sample values. A discrete time sequence detector, such as a Viterbi detector, interprets the discrete time sample values in context to determine an estimated digital sequence most likely to have generated the sample values. In this manner, the effect of ISI can be taken into account during the detection process, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp. 921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp. 38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker et al, "Implementation of PRML in a Rigid Disk Drive", *IEEE Trans. on Magnetics*, Vol. 27, No. 6, November 1991; and Carley et al, "Adaptive Continuous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp. 1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag'90*.

The format of the data stored on the magnetic disk, as shown in FIG. 1A and 1B, is similar for both peak detection and sampled amplitude read channels. The data is stored as a series of concentric tracks 13 each comprising a number of user data sectors 15 and embedded servo data sectors 17. As illustrated in FIG. 1A, the embedded servo data sectors 17 are recorded at the same data rate across the disk's radius. For the user data sectors 15, however, the disk is partitioned into a number of zones (e.g., an outer zone 11 and an inner zone 27) and the data rate increased in the outer zones in order to achieve a more constant linear bit density. This "zoned" recording technique allows more data to be stored in the outer diameter tracks, thereby increasing the overall capacity of the disk.

FIG. 1B shows the format of a user data sector 15 comprising an acquisition preamble 68, sync mark 70 and data field 72. The read channel processes the acquisition preamble 68 to adjust the magnitude of the read signal and synchronize timing recovery in sampled amplitude read channels so that it can accurately read the data field 72. The sync mark 70 demarks the beginning of the data field 72, and when the read channel detects the sync mark 70, it enables operation of a channel decoder to begin decoding the detected data sequence.

The sync mark 70 must be detected at the correct time or the read channel cannot synchronize to the data field 72. Errors due to noise in the system can cause the read channel to detect the sync mark 70 too early, too late, or fail to detect it altogether. That is, errors in the read signal can cause the read channel to falsely detect the sync mark as the end of the preamble concatenated with the beginning of the sync mark, the end of the sync mark concatenated with the beginning of the user data, or not at all. When this happens, error detection circuitry within the disk controller will recognize that the sync mark was falsely detected or not detected and initiate a re-try. The storage system will wait for the disk to complete a revolution, which increases the overall access time, and again attempt to accurately detect the sync mark.

Conventional sync mark detectors in sampled amplitude read channels detect the sync mark 70 by correlating a target sync mark with the bit sequence detected from the read signal. In order to minimize the probability of early misdetection, the sync mark 70 is selected to have a minimum correlation with the sync mark 70 concatenated with the preamble 68. It is also selected for maximum probability of correct detection when the sync mark is corrupted by errors due to noise. This is accomplished with a computer search program which searches for an appropriate sync mark by correlating a target sync mark with shifted values of the target sync mark appended to the preamble. The search program also correlates the target sync mark with corrupted versions of the sync mark appended to the preamble. Selecting a sync mark to have minimum correlation with the preamble increases the fault tolerance of the sync mark detector.

Prior art sync mark detectors do not use the preamble 68 to assist in detecting the sync mark 70. Instead, conventional sync mark detectors execute a correlation with each new bit detected from the read signal. For example, U.S. Pat. No. 5,384,671 issued to Fisher discloses a sync mark detection technique that selects a sync mark to have minimum correlation with the preamble but does not use information from the preamble in the detection process. Furthermore, prior art sync mark detectors do not use the sign of the sampled data in order to improve the correlation sensitivity.

In the above referenced co-pending patent application entitled "FAULT TOLERANT SYNC MARK DETECTOR FOR COMPARING A SIGN AND MAGNITUDE OF A DETETECTED SEQUENCE TO A TARGET SYNC MARK IN SAMPLED AMPLITUDE MAGNETIC RECORDING" a sync mark detector is disclosed that enhances detection accuracy by exploiting the information provided by the sign of the sample values in the sync mark, as well as by enabling operation of the sync detector relative to a frequency of the acquisition preamble. Although the technique disclosed in that application provides a significant improvement over the prior art, it cannot be used in sampled amplitude read channels employing a time varying sequence detector.

Time varying sequence detectors provide distance enhancing performance gains by matching the detector's state machine to a property in a trellis code. For example, in the above referenced co-pending patent application entitled "TRELLIS CODING SYSTEM FOR DISC STORAGE SYSTEMS" a trellis code is employed which forbids runs of four or more consecutive transitions and allows runs of three consecutive transitions to begin only at every other sample interval (i.e., symbol interval). Consequently, the trellis state machine in the sequence detector alternates between allowing and not allowing three consecutive transitions, depending on the current sample interval. This modification provides coding gain by coding out certain minimum distance error events inherent in a conventional EEPR4 Viterbi algorithm. In order for this technique to work, however, the detector's state machine must be correctly synchronized to the user data so that it knows which sample interval to allow runs of three transitions to begin in. This requires that the sync mark be detected from the channel samples at the input of the sequence detector, rather than from the estimated data output by the sequence detector as in the prior art.

The present invention addresses the need for a fault tolerant sync mark detector capable of detecting a sync mark from the channel samples in order to synchronize the state machine of a time varying sequence detector. Another object of the present invention is to use information from the acquisition preamble in order to further increase the fault tolerance of the sync mark detector.

SUMMARY OF THE INVENTION

In a magnetic disk storage system, a sampled amplitude read channel is disclosed that employs a fault tolerant sync mark detector for detecting a sync mark from the channel samples in order to synchronize a time varying sequence detector. The read channel preferably employs PR4 equalization for timing recovery and gain control, and EEPR4 equalization for sequence detection. The EEPR4 sequence detector operates according to a time varying state machine matched to a predetermined trellis code constraint. Because the state machine is time varying, the data stream must be synchronized at the input of the sequence detector rather than at the output as in the prior art. The present invention provides a fault tolerant sync mark detector that detects a sync mark from the EEPR4 channel samples before being input into the sequence detector. In one embodiment, the sync mark detector accumulates a squared error between the read signal sample values and the target sample values of the target sync mark; the sync mark is detected when the accumulated squared error is less than a predetermined lower threshold. In an alternative embodiment, the sync mark detector computes a correlation between the read signal sample values and the target sample values of the target sync mark; the sync mark is detected when the correlation is greater than a predetermined upper threshold. The correlation sync mark detector is the preferred embodiment because it is insensitive to d.c. offsets in the read signal, and it exhibits excellent performance in detecting short sync marks. Furthermore, the correlator can be implemented as two cascaded finite impulse response filters without requiring multipliers or squarers.

Another aspect of the present invention is to improve the fault tolerance of the sync mark detector by using information provided in the acquisition preamble. As described above, the acquisition preamble is a periodic signal that immediately precedes the sync mark for use in synchronizing timing recovery and adjusting the gain of the read signal before attempting to detect the sync mark and the user data field. Because the preamble is periodic, a state machine can generate the estimated sample values for use in computing the timing recovery phase errors and the gain control gain errors. Each state in the state machine corresponds to a state or phase of the acquisition preamble. In a 2T acquisition preamble, for example, the signal is sinusoidal with four samples, or states, per period. By writing the preamble to the disk such that it always ends in two of the four states, the sync mark can occur only when the state machine is in one of the two corresponding states. Thus, the sync mark detector need only search for the sync mark when the state machine is in a valid state. In the preferred embodiment, the sync mark detector searches for the sync mark by correlating the data stream with the target sync mark at every other sample period, which significantly increases its fault tolerance.

BRIEF DESCRIPTION OF THE DRAWINGS

FIG. 5A and 5B show the state transition diagrams that the time varying sequence detector alternates between.

FIG. 8 shows details of the correlator version of the fault tolerant sync mark detector of the present invention.

FIG. 9A shows an embodiment of the present invention wherein the sync mark is detected as the maximum correlation over a predefined window of sample periods.

FIG. 9B shows the necessary modification to the read channel to implement the sync detection window of FIG. 9A, a buffer for buffering the channel samples before they are input into the sequence detector.

DETAILED DESCRIPTION OF THE PREFERRED EMBODIMENT

Data Format

Figure 1A:
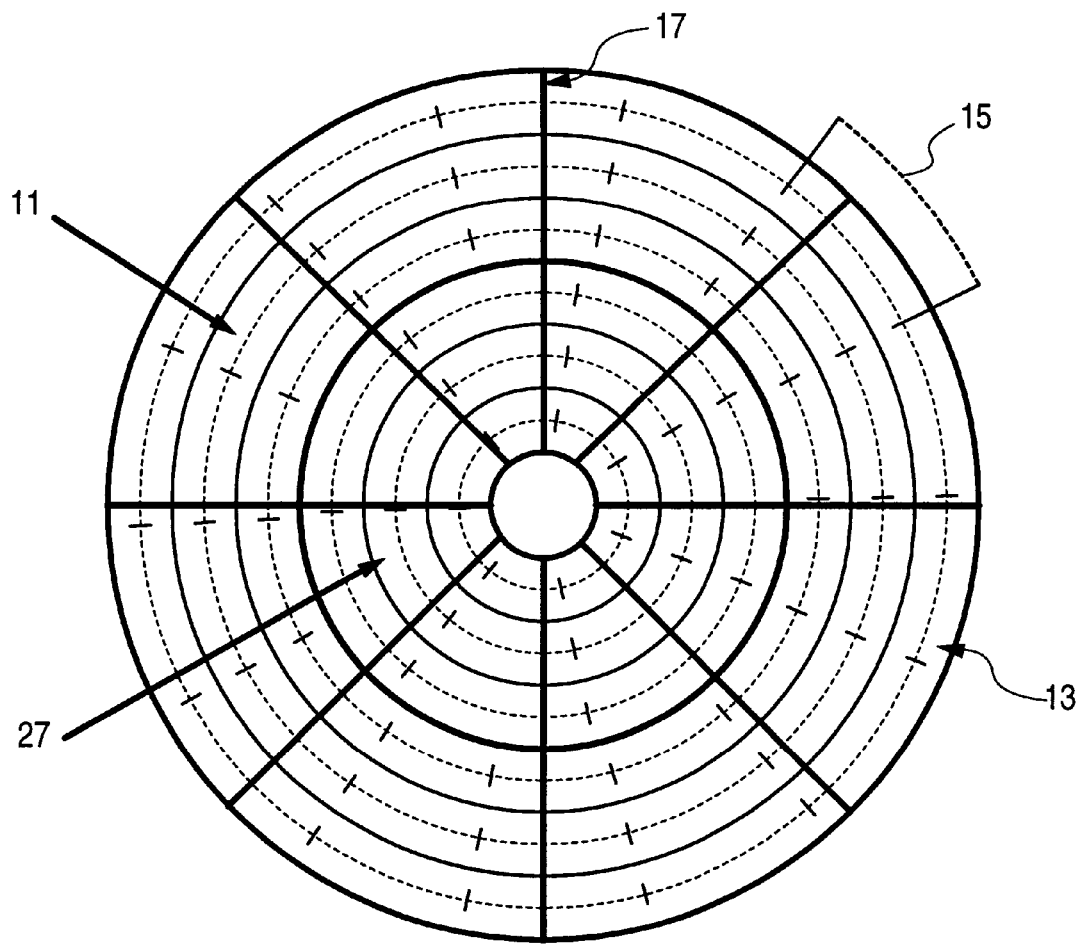
FIG. 1A shows an exemplary data format of a magnetic disk having a plurality of concentric tracks comprised of a plurality of user data sectors and embedded servo data wedges.

FIG. 1A shows an exemplary data format of a magnetic disk medium comprising a series of concentric data tracks 13 wherein each data track 13 comprises a plurality of sectors 15 with embedded servo wedges 17. A servo controller (not shown) processes the servo data in the servo wedges 17 and, in response thereto, positions a read/write head over a desired track. Additionally, the servo controller processes servo bursts within the servo wedges 17 to keep the head aligned over a centerline of the desired track while writing and reading data. The servo wedges 17 may be detected by a simple discrete time pulse detector or by a discrete time sequence detector. In any case, the servo wedges 17 typically include a preamble and a sync mark for synchronizing to the servo data, similar to the user data sectors 15.

Figure 1B:
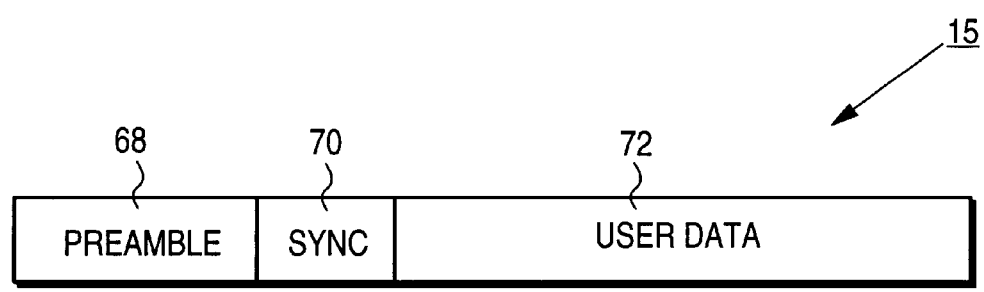
FIG. 1B shows an exemplary-format of a user data sector.

FIG. 1B shows the format of a user data sector 15 comprising an acquisition preamble 68, a sync mark 70, and user data 72. Timing recovery in the read channel processes the acquisition preamble 68 to acquire the correct sampling frequency and phase before reading the user data 72, and the sync mark 70 demarks the beginning of the user data 72. In the present invention, the sync mark 70 is used to synchronize the state machine of a time varying sequence detector as well as to symbol synchronize a trellis decoder as described in more detail below.

The storage capacity at the outer tracks can be increased due to the increase in circumferential recording area (i.e. due to the decrease in ISI). Accordingly, the disk shown in FIG. 1A is partitioned into an outer zone 11 comprising fourteen data sectors per track, and an inner zone 27 comprising seven data sectors per track. In practice, the disk is actually partitioned into several zones, wherein the capacity and data rate increases from the inner to outer zones.

Conventional Sampled Amplitude Read channel

Figure 2:
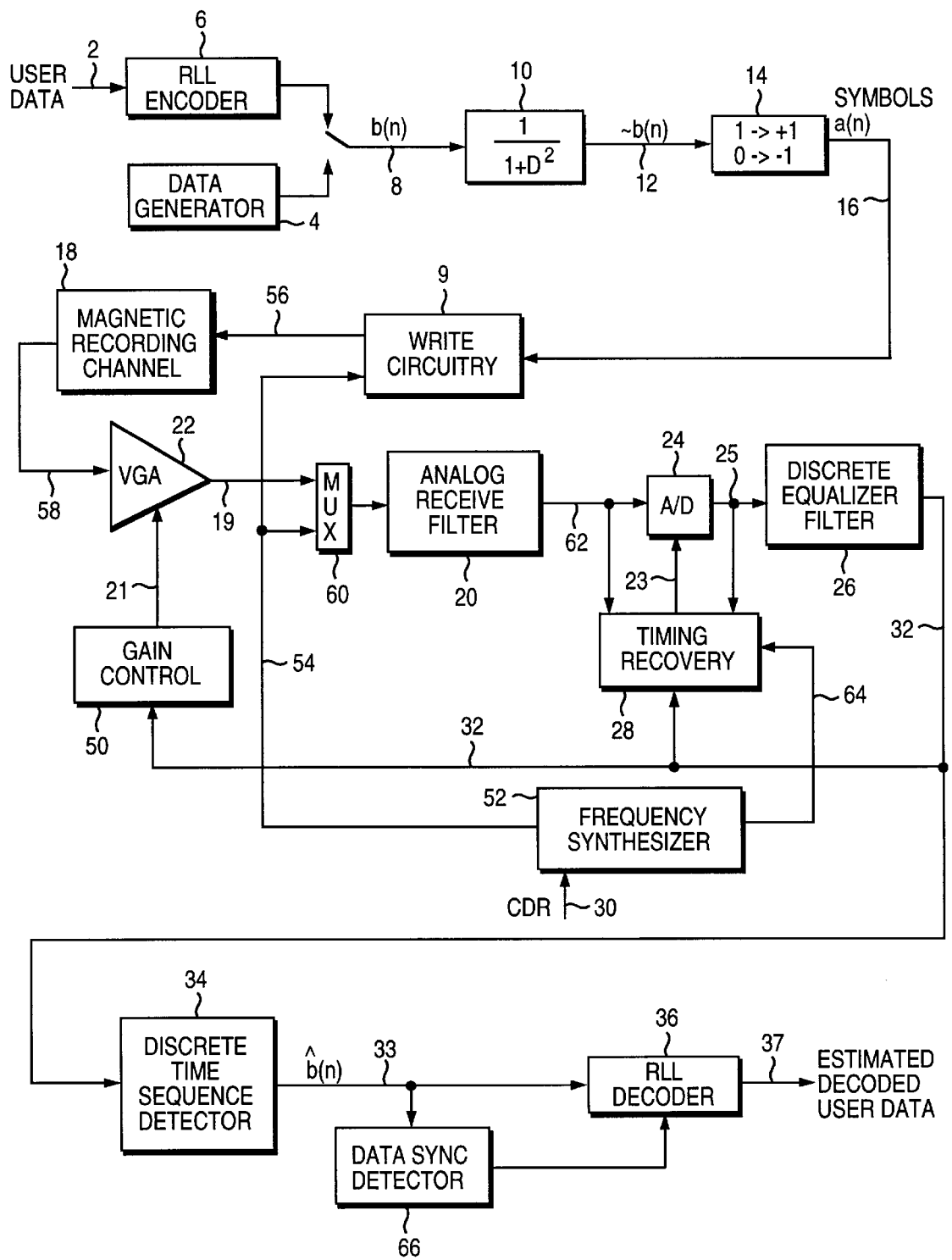
FIG. 2 is a block diagram of a conventional sampled amplitude read channel comprising a sync mark detector that detects the sync mark from the estimated data sequence output by the sequence detector.

Referring now to FIG. 2, shown is a detailed block diagram of a conventional sampled amplitude read channel. During a write operation, a data generator 4 outputs preamble data 68 and a sync mark 70 recorded on the disk prior to recording the user data field 72 (see FIG. 1B). A run-length limited (RLL) encoder 6 encodes the user data input over line 2 into a binary sequence b(n) 8 according to a conventional RLL (d,k) constraint. A precoder ($1/(1+D^2)$) 10 (for PR4 read channels) precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the channel or baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexer 60. Once locked to the write frequency, the multiplexer 60 selects the signal 19 from the read head as the input to the read channel in order to acquire an acquisition preamble 68 recorded on the disk preceding the recorded user data 72 as shown in FIG. 1B. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1:

TABLE 1

| Channel | Transfer Function | Dipulse Response |
| --- | --- | --- |
| PR4 | (1 − D) (1 + D) | 0, 1, 0, −1, 0, 0, 0, . . . |
| EPR4 | (1 − D) (1 + D)$^2$ | 0, 1, 1, −1, −1, 0, 0, . . . |
| EEPR4 | (1 − D) (1 + D)$^3$ | 0, 1, 2, 0, −2, −1, 0, . . . |

After equalization, the equalized sample values 32 are applied to a decision directed gain control 50 and timing recovery 28 circuit for adjusting the amplitude of the read signal 58 and the frequency and phase of the sampling device 24, respectively. Gain control 50 adjusts the gain of variable gain amplifier 22 over line 21 in order to match the magnitude of the channel's frequency response to the desired partial response, and timing recovery 28 adjusts the frequency of sampling device 24 over line 23 in order to synchronize the equalized samples 32 to the baud rate. Frequency synthesizer 52 provides a coarse center frequency setting to the timing recovery circuit 28 over line 64 in order to center the timing recovery frequency over temperature, voltage, and process variations.

The equalized samples Y(n) 32 are ultimately input into a discrete time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 from the sequence detector 34 into estimated user data 37. A data sync detector 66 detects a sync mark 70 (shown in FIG. 1B) in the data sector 15 in order to frame operation of the RLL decoder 36. In the absence of errors, the estimated binary sequence ^b(n) 33 matches the recorded binary sequence b(n) 8, and the decoded user data 37 matches the recorded user data 2.

Improved Sampled Amplitude Read Channel

Figure 3:
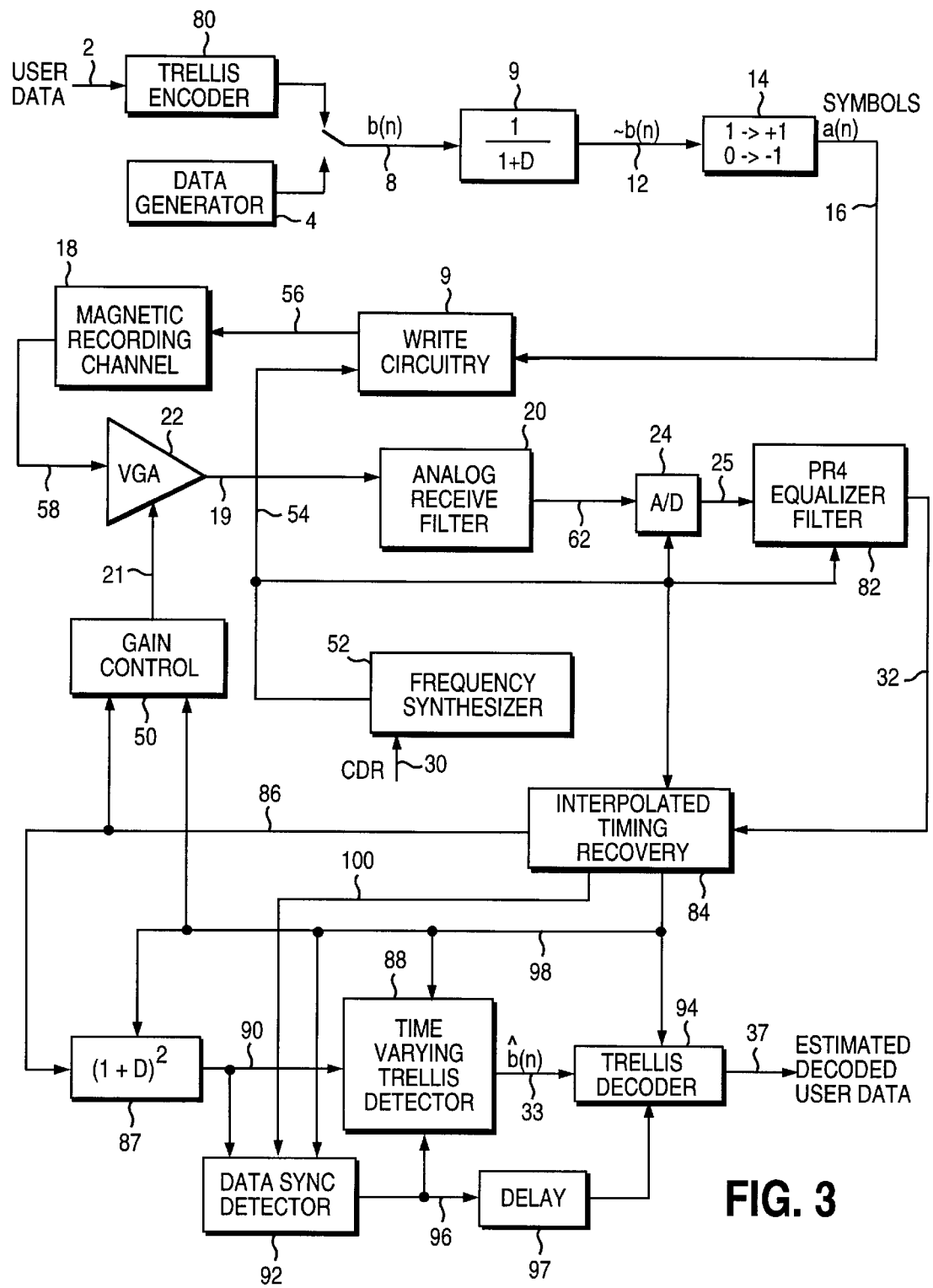
FIG. 3 is a block diagram of the sampled amplitude read channel of the present invention comprising a fault tolerant sync mark detector for detecting a sync mark from the channel samples in order to synchronize a time varying sequence detector matched to a trellis code.

FIG. 3 shows the improved sampled amplitude read channel of the present invention wherein the conventional RLL encoder 6 of FIG. 2 has been replaced by a trellis encoder 80 for implementing a predetermined trellis code constraint. The $1/1+D^2$ precoder 10 of FIG. 2 is replaced with a 1/1+D precoder 9 since the preferred embodiment for the discrete time sequence detector described below is an EEPR4 Viterbi sequence detector. The read signal is preferably first equalized into a PR4 response by the analog receive filter 20 and a PR4 discrete time equalizer 82; the PR4 sample values are then used for timing recovery and gain control. Also in the preferred embodiment, the conventional sampled timing recovery 28 of FIG. 2 is replaced by interpolated timing recovery 84 which is more reliable due to the mostly digital implementation. The frequency synthesizer 52 generates a baud rate write clock 54 applied to the write circuitry 9 during write operations, and an asynchronous read clock 54 during read operations for clocking the sampling device 24, the PR4 discrete time equalizer 82, and the interpolated timing recovery circuit 84 at a frequency relative to the current zone (CDR 30).

The interpolated timing recovery 84 interpolates the equalized sample values 32 to generate interpolated sample values 86 substantially synchronized to the channel or baud rate of the current zone. The interpolated sample values 86 are then converted into an EEPR4 response by passing the samples through a $(1+D)^2$ filter 87. A time varying trellis sequence detector 88, matched to the EEPR4 response as well as a trellis code constraint, detects an estimated binary sequence 33 representing the user data from the EEPR4 sample values 90 (synchronous sample values). Because the sequence detector 88 is time varying, its state machine must be correctly synchronized to the EEPR4 channel sample values at the input of the detector. Thus, the present invention employs a sync mark detector 92 that detects the sync mark from the EEPR4 channel samples 90 rather than from the estimated data sequence 33 output by the sequence detector as in the prior art read channel of FIG. 2.

Two alternative embodiments of the sync mark detector 92 are disclosed below. In one embodiment, the sync mark detector computes a squared error between the channel sample values and the sample values of a target sync mark;

the sync mark is detected when the squared error is less than a predetermined lower threshold. In a second embodiment, the sync mark detector 92 computes a correlation between the channel sample values and the sample values of a target sync mark; the sync mark is detected when the correlation exceeds a predetermined upper threshold. The correlation sync mark detector is the preferred embodiment due to its insensitivity to d.c. offsets in the read signal, and due to its excellent ability to accurately detect short sync marks. Furthermore, the correlator can be implemented as two cascaded finite impulse response filters without requiring multipliers or squarers.

The data symbols in the estimated binary data sequence 33 output by the sequence detector 88 are ultimately decoded by a trellis decoder 94 which implements the reverse mapping of the trellis encoder 80. In order for the decoder to operate correctly, it must be properly synchronized to the symbol boundaries in the estimated data sequence 33. Thus, the fault tolerant sync mark detector 92 generates a control signal over line 96 for sample synchronizing the time varying trellis sequence detector 88, and for symbol synchronizing the trellis decoder 94. The control signal 96 is delayed 97 before being applied to the trellis decoder 94 to account for the delay in the sequence detector 88. The interpolated timing recovery circuit 84 generates a synchronous data clock 98 for clocking operation of the gain control 50, PR4 equalizer filter 82, time varying trellis sequence detector 88, sync mark detector 92 and trellis decoder 94. The interpolated timing recovery circuit 84 also generates a control signal over line 100 to enable operation of the sync mark detector relative to a frequency of the acquisition preamble 68 of FIG. 1B. As discussed in greater detail below, enabling the sync mark detector 92 using information from the acquisition preamble significantly increases its fault tolerance.

Timing Recovery

Figure 4:
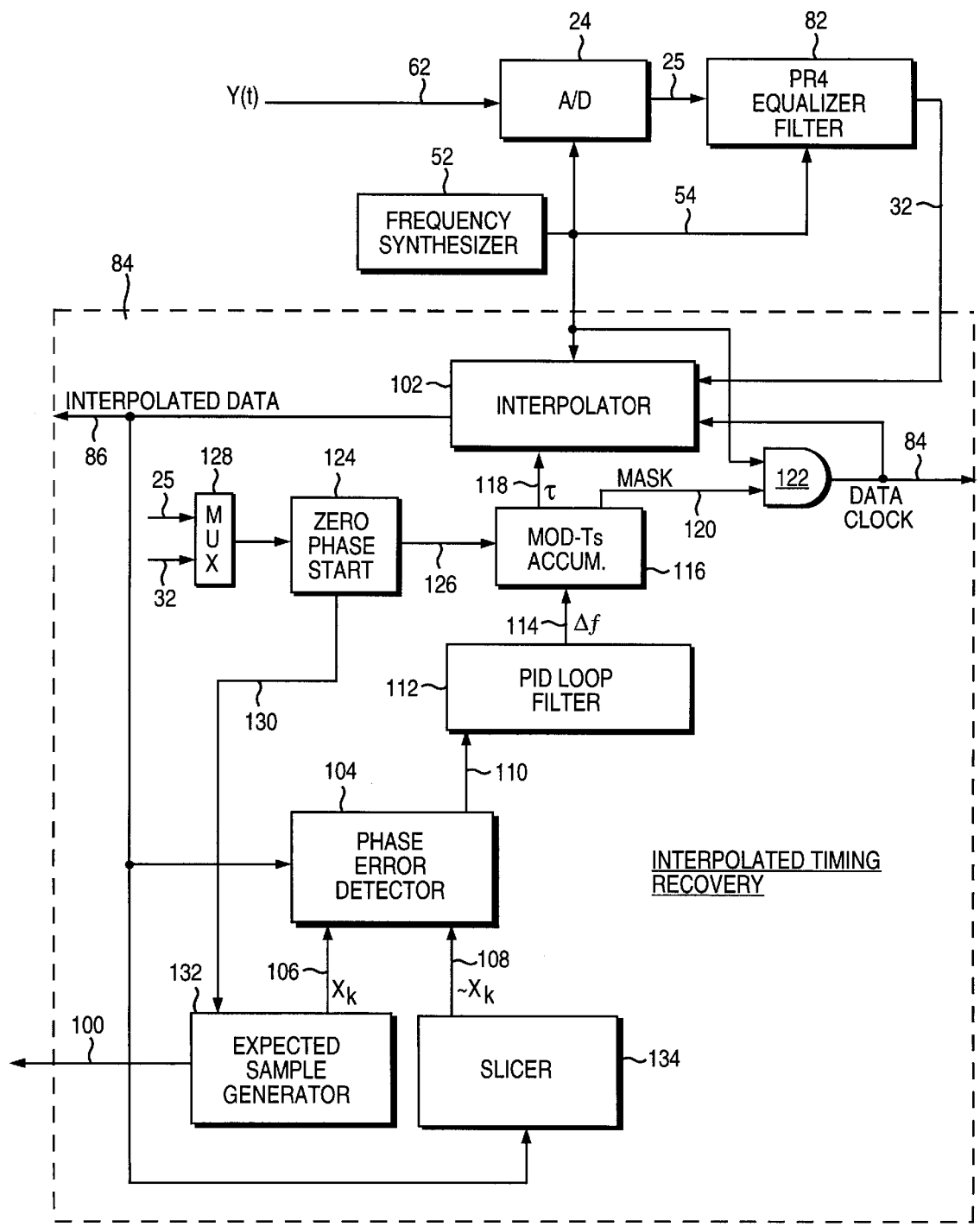
FIG. 4 shows details of the interpolated timing recovery circuit of the present invention, including an expected sample value generator for generating expected sample values during acquisition.

Details of the interpolated timing recovery circuit 84 of the present invention are shown in FIG. 4. The function of the timing recovery circuit is to synchronize the channel samples to the baud rate (code bit rate). In conventional synchronous sampling timing recovery circuits as shown in FIG. 2, a phase lock loop controls the sampling device 24 in order to lock the frequency and phase of the read signal samples to the frequency and phase of the baud rate. With interpolated timing recovery of FIG. 4, the analog read signal 62 is sampled asynchronously, and an interpolator 102 interpolates the asynchronous samples 32 to generate synchronous sample values 86.

A phase error detector 104 generates a phase error 110 by computing the offset between the interpolated samples 86 and ideal sample values (expected 106 or estimated 108). The phase error 110 is filtered by a PID loop filter 112 to generate a frequency offset $\Delta f$ 114 representing the frequency error between the interpolated samples and the baud rate. A modulo-Ts accumulator 116 accumulates the frequency error $\Delta f$ 114 (modulo the sample period Ts) to generate an interpolation interval $\tau$ 118. The interpolation interval $\tau$ 118 represents the time delay or phase offset between the asynchronous and synchronous sample values. An interpolation filter (preferably a time varying FIR filter) within the interpolator 102 processes the interpolation interval $\tau$ 118 to generate the interpolated (synchronous) sample values 86. The modulo-Ts accumulator 116 also generates a mask signal 120 for masking the sampling clock 54 every time the accumulated frequency offset $\Delta f$ 114, integer divided by the sample period Ts, increments by one. The sampling clock 54 is masked through an AND gate 122 to generate a data clock 84 substantially synchronized to the baud rate. As described above the data clock 84 is for clocking the discrete time circuitry down stream from the interpolator 102.

The interpolated timing recovery circuit of FIG. 4 further comprises a zero phase restart (ZPR) circuit 124 which minimizes the initial phase error between the interpolated sample values and the baud rate before acquiring the acquisition preamble 68 of FIG. 1B. This reduces the time needed to acquire the correct sampling phase and frequency and, consequently, minimizes the length of the acquisition preamble 68. The ZPR circuit 124 computes an initial phase error $\tau$ 126 from the A/D 24 sample values 25 or the equalized sample values 32 (as selected through multiplexer 128) and loads this initial phase error $\tau$ 118 into the modulo-Ts accumulator 116 (see the above referenced patent application entitled "ZERO PHASE RESTART FOR INTERPOLATED TIMING RECOVERY IN A SAMPLED AMPLITUDE READ CHANNEL"). The ZPR circuit 124 also generates a control signal 130 for initializing the starting state of an expected sample generator 132.

The expected sample value generator 132 generates expected samples $X_k$ 106 for use in computing the phase error 110 during acquisition. The expected samples 106 correspond to the samples of the acquisition preamble 68, which are known. For example, if the acquisition preamble is a 2T preamble, then the read signal is sinusoidal where the expected preamble samples are $$( \ldots +1,+1,-1,-1,+1,+1,-1,-1, \ldots )$$

A simple state machine, such as a counter, can generate the expected samples 106 of the preamble independent of the actual read signal. The ZPR circuit 124 processes the channel samples to determine the initial starting state for the state machine (i.e., the state that corresponds to the current phase of the acquisition preamble).

Near the end of the acquisition preamble, the phase error detector 104 begins processing estimated sample values $\sim X_k$ 108 generated by a slicer 134 in order to compute the phase error 110 over the random user data. The slicer 134 computes the estimated ideal sample values $\sim X_k$ 108 by comparing the interpolated samples 86 to positive and negative thresholds; a +1 is output if the current read signal sample is above the positive threshold, a −1 is output if the current read signal sample is below the negative threshold, and a 0 is output otherwise.

In the present invention, information from the acquisition preamble 68 is advantageously used to detect the sync mark 70 of FIG. 1B, thereby increasing the fault tolerance of the sync mark detector 92. During a write operation, the acquisition preamble 68 is written to the disk such that it ends in a predetermined phase state. For example, a 2T acquisition preamble may be written such that it ends in samples +1,+1 or −1,−1 (and not +1,−1 or −1,+1). In this manner, the sync mark 70 will be detected only when the expected sample generator 132 state machine is in either state +1,+1 or −1,−1 (and not state +1,−1 or −1,+1). In other words, it is only necessary for the sync marc detector 92 of FIG. 3 to search for the sync mark 70 during every other sample interval. As described in greater detail below, the state machine enables the sync mark detector 92 over control line 100 during the appropriate sample interval.

Sync Mark Detector

After acquiring the preamble 68 of FIG. 1B, a data sync mark detector 92 of FIG. 3 searches for the sync mark 70 in order to frame the symbols of user data field 72 for the trellis decoder 94. Unlike the prior art sync mark detector 66 of FIG. 2, which searches for the sync mark 70 in the estimated data sequence 33 output by the sequence detector 34, the sync mark detector 92 of the present invention searches for the sync mark 70 in the channel sample values at the input the sequence detector 88. The reason is because the sequence detector 88 of FIG. 3 is time varying and must be properly synchronized to the incoming sample values. For example, the time varying sequence detector 88 may be matched to the trellis code described in the above referenced patent application entitled "TRELLIS CODING SYSTEM FOR DISC STORAGE SYSTEMS." The trellis code in that patent application implements the following constraints:

1. runs of four or more consecutive magnetic transitions are forbidden; and
2. runs of three consecutive magnetic transitions can begin only during every other sample interval (i.e., only in the even interleave or only in the odd interleave).

Figure 5A:
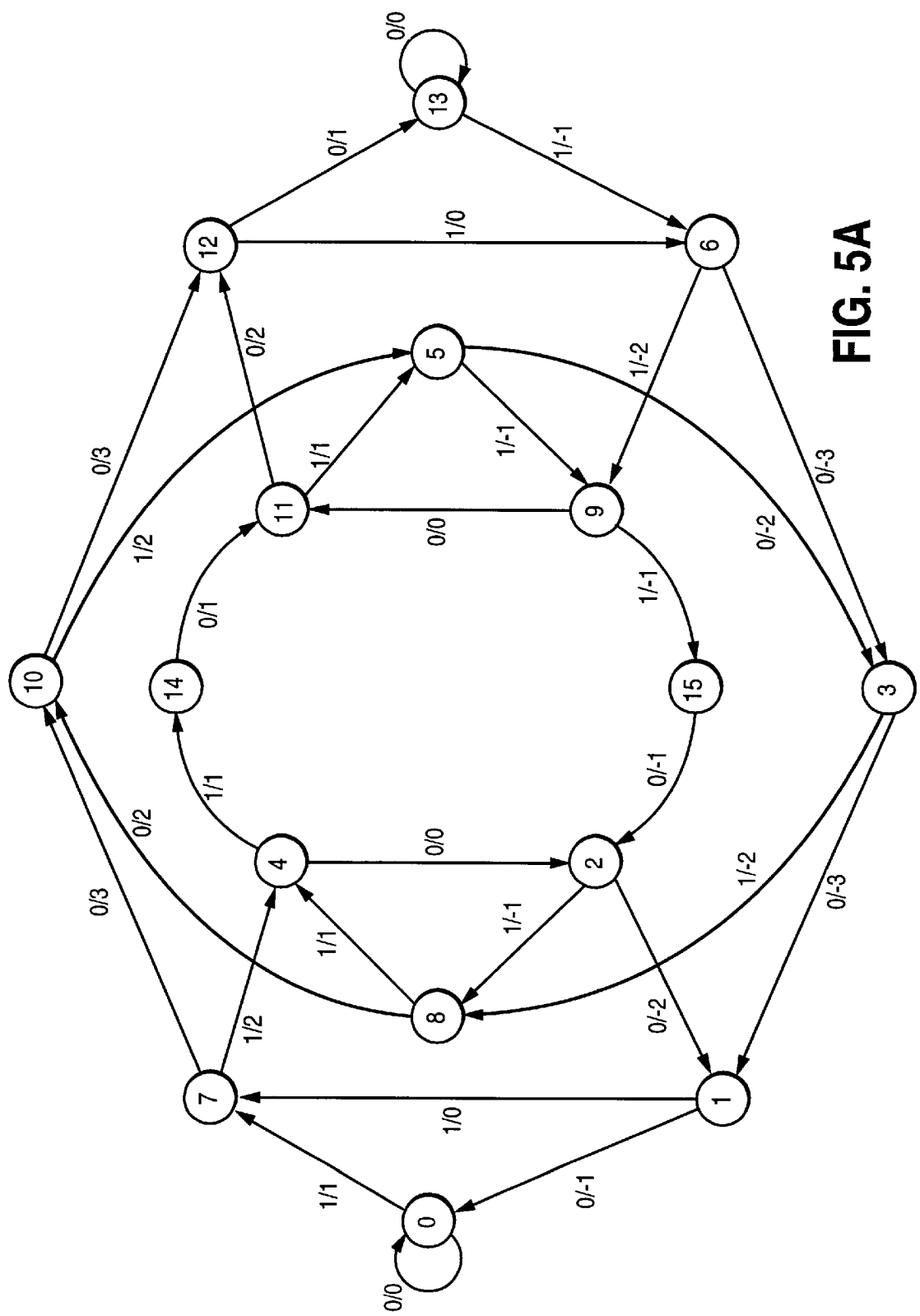
Figure 5B:
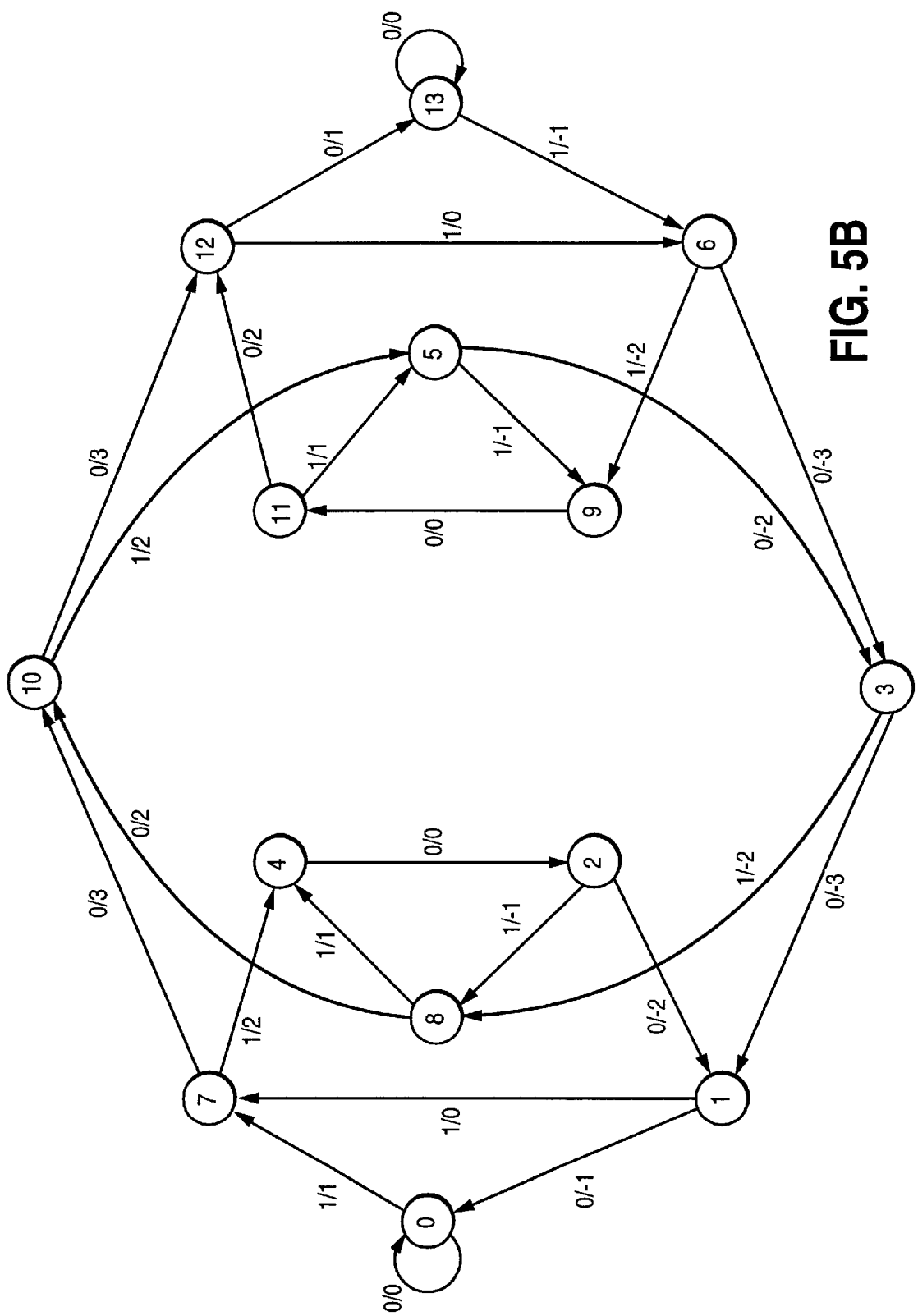

In the preferred embodiment, the time varying sequence detector 88 of FIG. 3 is an EEPR4 Viterbi sequence detector 88 comprising a trellis state machine that alternates, during every other sample interval, between the state transition diagram of FIG. 5A, which allows three consecutive magnetic transitions, and the state transition diagram of FIG. 5B, which forbids three consecutive magnetic transitions (both FIG. 5A and 5B forbid runs of four or more consecutive magnetic transitions).

Thus, the sync mark detector 92 must detect the sync mark 70 up stream from the sequence detector 88 in order to synchronize the detector's trellis state machine to the appropriate state transition diagram. It should be noted that the particular trellis code employed is not a limitation of the present invention; the sync mark detector 92 as described below is intended to synchronize any time varying sequence detector that operates according to a time varying trellis state machine.

The sync mark detector 92 detects the sync mark 70 by comparing the EEPR4 channel samples 90 to the sample values of an EEPR4 target sync mark. In order to minimize the probability of early misdetection, the sync mark 70 is selected to have a minimum correlation with the sync mark 70 concatenated with the preamble 68. It is also selected for maximum probability of correct detection when the sync mark is corrupted by errors due to noise. This is accomplished with a computer search program which searches for an appropriate sync mark by correlating a target sync mark with shifted values of the target sync mark appended to the preamble. The search program also correlates the target sync mark with corrupted versions of the sync mark appended to the preamble.

Referring again to FIG. 1B, the acquisition preamble 68 is processed during acquisition mode in order to lock the timing recovery PLL to the desired phase and frequency before reading the user data field 72. Once locked onto the acquisition preamble 68, the PLL switches into tracking mode and, after detecting the sync mark 70, begins tracking user data 72. To record the acquisition preamble to the disk, the data generator 4 outputs a series of "1" bits to generate a 2T acquisition preamble sequence at the output of the precoder 10 of the form (1,1,0,0,1,1,0,0,1,1,0,0, . . . ). During acquisition, the preamble is "side sampled" to generate the following sample sequence:

( . . . , +1,+1,−1,−1,+1,+1,−1,−1,+1,+1,−1,−1, . . . ).

Figure 6A:
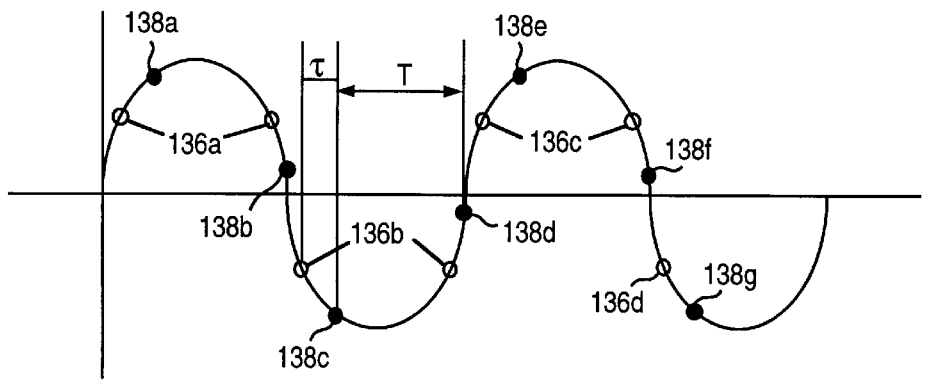
FIG. 6A shows the phase offset of a sampled 2T acquisition preamble relative to the target sample values.
Figure 6B:
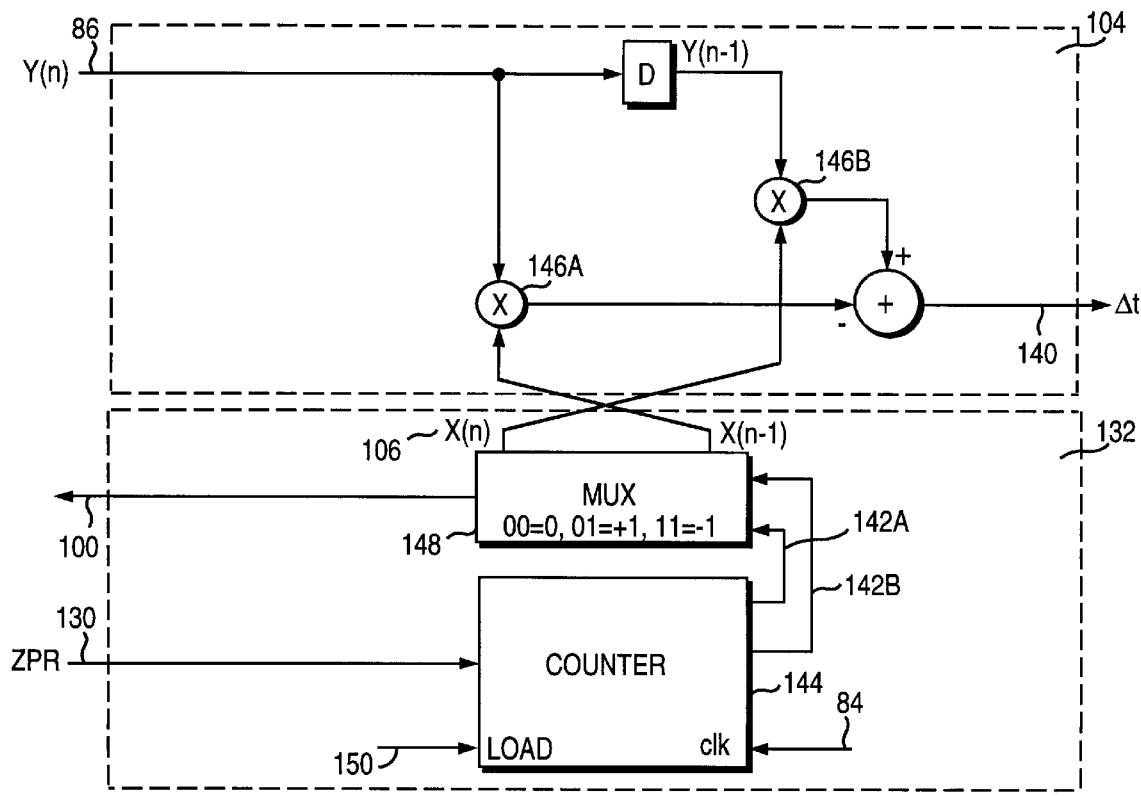
FIG. 6B shows details of the expected sample value generator for generating expected sample values used to compute the timing recovery phase error while acquiring the acquisition preamble.

FIG. 6A shows the 2T preamble "side sampled" with the expected samples 136 in relation to the signal samples 138 and a corresponding phase error τ. FIG. 6B shows an implementation of the phase error detector 104 and the expected sample value generator 132 of FIG. 4. The phase error detector 104 computes a timing gradient Δt 140 which minimizes the mean squared error between the interpolated read signal sample values 86 and expected sample values 106. As shown in FIG. 6B, the timing gradient Δt 140 is computed as:

$$\Delta t(n) = Y(n-1) \cdot X(n) - Y(n) \cdot X(n-1)$$

where Y(n) are the interpolated read signal sample values 86 and X(n) are the expected sample values 106 of the acquisition preamble.

Referring again to FIG. 6B, the outputs (142A,142B) of a 2-bit counter 144 correspond to the expected "side sampled" preamble sequence:

00 → +1,−1,

01 → −1,−1,

10 → −1,+1,

11 → +1,+1.

The magnitude of the expected sample values is scaled to 1 so that the multipliers (146A,146B) of the phase error detector 104 multiply by +1, −1 or 0. Thus, the expected sample values X(n) 106 are two bits wide in order to represent the ternary values:

(00=0, 01=1, and 11=−1).

A multiplexer 148, responsive to the outputs (142A,142B) of the counter 144, selects the expected sample values X(n) 106 which correspond to the current counter state. The counter 144 is loaded 150 with an initial starting state by ZPR control signal 130 as described above with reference to FIG. 4.

After the counter 144 is loaded with the initial starting state, it sequences through the states according to the expected samples in the 2T preamble at each data clock 84. The four possible sequences are:

(+1,−1,−1,+1,+1,−1, . . . );

(−1,−1,+1,+1,−1,−1, . . . );

(−1,+1,+1,−1,−1,+1, . . . ); and (+1,+1,−1,−1,+1,+1, . . . ).

Using a counter to generate expected sample values avoids a "hang up" problem associated with the prior art, and, in addition, the state of the counter 144 can be advantageously used in the selection and detection of the sync mark 70.

If the 2T acquisition preamble 68 always ends with two positive samples +1,+1 or two negative samples −1,−1 (e.g., samples 136c in FIG. 6A), then the output 86 of the interpolator 102 will be the last preamble sample only when the counter 144 of FIG. 6B is in state (−1,−1) or (+1,+1) which corresponds to counter 144 outputs 01 (i.e., the count is one) or 11 (i.e., the count is three). Therefore, the interpolated sample 84 will be the first sample of the sync mark only when the counter 144 output is 10 (ie., the count is two) or 00 (i.e., the count is zero). Thus, the state of the counter is supplied over line 100 to the sync mark detector 92 in order to enable it relative to these two counter states, that is, only at every other sample period.

To ensure that the acquisition preamble 68 always ends in the desired phase state (such as two positive samples or two negative samples), the state of the precoder 10 is initialized to an appropriate value when writing the preamble 68 to the disk. For example, the delay registers in the 1/1+D² precoder 10 are initialized to zero and an even number of 1 bits are output by the data generator 4 to ensure that the preamble ends in either two positive samples or two negative samples.

Enabling the sync mark detector 92 at every other sample period aids in the computer search for the optimum fault tolerant sync mark. The search program can search for minimum correlation between the sync mark and shifted versions of the sync mark concatenated with the preamble at every other shift rather than at every shift. This increases the probability of finding a sync mark having a higher degree of fault tolerance.

The sync mark detection technique of the present invention can be easily extended to search for the sync mark at every fourth sample period rather than at every other sample period. This requires that the preamble always end in the same two sample values (i.e., the preamble ends with the counter 144 in one out of the four possible states). Further, this technique can easily be extended for use with other preamble formats (e.g., 3T, 4T, 6T, etc.) and with other types of PR read channels (e.g., PR4 and EPR4).

Detecting the sync mark from the channel samples requires a modification to the prior art sync mark detectors which detect the sync mark from the estimated data sequence output by the sequence detector. Disclosed below are two alternative embodiments for the sync mark detector of the present invention. In a first embodiment, the sync mark detector computes a squared error between the channel sample values and the sample values of the target sync mark; the sync mark is detected when the squared error is less than a predetermined lower threshold. In a second embodiment, the sync mark detector computes a correlation between the channel sample values and the sample values of the target sync mark; the sync mark is detected when the correlation exceeds a predetermined upper threshold. The correlation sync mark detector is the preferred embodiment due to its insensitivity to d.c. offsets in the read signal, as well as its excellent performance in detecting short sync marks. Furthermore, the correlator can be implemented as two cascaded finite impulse response filters without requiring multipliers or squarers.

Least Squared Error Sync Mark Detector

Figure 7:
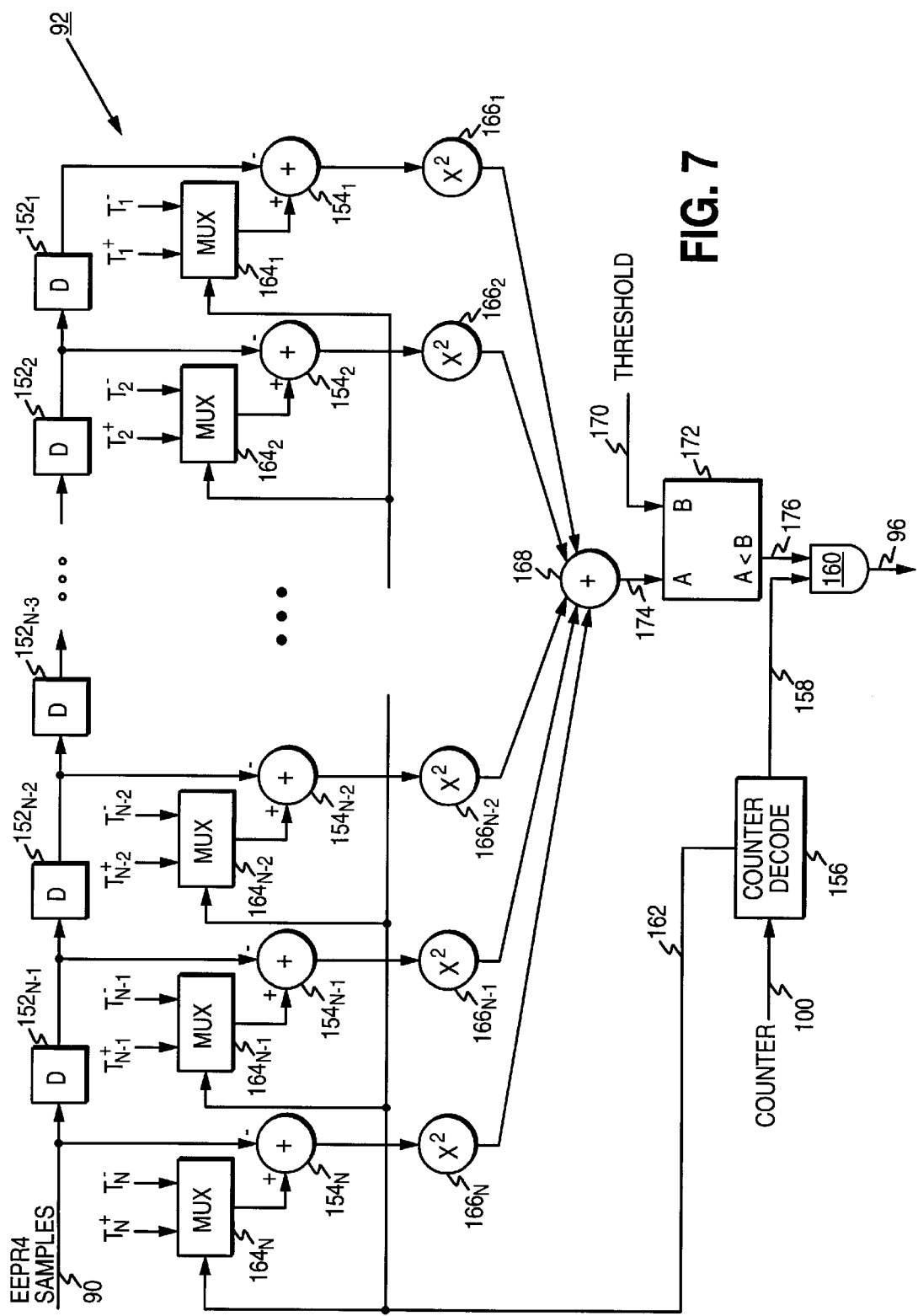
FIG. 7 shows details of the squared error version of the fault tolerant sync mark detector of the present invention.

Details of the least squared error sync mark detector of the present invention are shown in FIG. 7. This embodiment detects the sync mark when the channel samples are closest to the target sync mark in Euclidean space, that is, when the squared error between the channel samples and the samples of the target sync mark reaches a minimum. The least squared error is computed as $$\sum_{k=1}^{N} (T_k - Y_k)^2$$

where $T_k$ are the samples of an N-sample target sync mark and $Y_k$ are the channel samples.

By evaluating various partial response signal spaces it was determined that for user densities between 2.0 and 3.0, the EEPR4 response provides the optimum performance; however, this should not be construed as a limitation of the present invention, only the currently preferred embodiment. Referring to FIG. 7, the EEPR4 channel samples 90 output by the (1+D)² filter 87 are shifted through a number of delay elements 152$_1$–152$_{N-1}$ where N is the number of samples in the target sync mark. A difference (error) between the EEPR4 channel samples and the samples of the target sync mark is then generated at the output of adders 154$_1$–154$_N$. In the preferred embodiment, the samples of the target sync mark in EEPR4 space are $(0,0,+1,+3,+3,+1,-1,-3,-3,-1)$ or $(0,0,-1,-3,-3,-1,+1,+3,+3,+1)$ depending on the polarity of the first magnetic transition which is determined from the polarity of the last magnetic transition in the acquisition preamble 68. As discussed above with reference to FIG. 6A and 6B, the acquisition preamble 68 is written to the disk so that it ends in either two positive or two negative samples. Therefore, the counter 144 of FIG. 6B will be in one of two states when the end of the preamble is reached. The state of the counter 144 is communicated over line 100 to a counter decode circuit 156 in FIG. 7. The counter decode circuit 156 decodes the counter state to generate an enable signal 158 for enabling the output of the sync mark detector through an AND gate 160 when the counter is in the appropriate state. In addition, the counter decode circuit 156 generates a control signal over line 162 to select the appropriate polarity for the sample values of the target sync mark (denoted T⁺ and T⁻) through multiplexers 164$_1$–164$_N$ depending on the current state of the counter 144.

The error values at the output of the adders 154$_1$–154$_N$ are then squared by squaring circuits 166$_1$–166$_N$, and the squared error values are summed at adder 168. The squared error 174 at the output of adder 168 is compared to a predetermined threshold 170 at comparator 172; the sync mark is detected when the squared error 174 is less than the threshold 170. The sync mark detect signal 176 is enabled through AND gate 160 when the counter 144 of FIG. 6B is in the appropriate state as described above with reference to FIG. 6A and 6B.

Correlator Sync Mark Detector

An alternative embodiment for the fault tolerant sync mark detector of the present invention is shown in FIG. 8. This embodiment is similar to that of FIG. 7 except that it computes a correlation between the channel samples and the samples of the target sync mark rather than a squared error. Mathematically, the correlation is computed as $$\sum_{k=1}^{N} (T_k \cdot Y_k)$$

Thus, the adders 154$_1$–154$_N$ of FIG. 7 for subtracting the channel samples $Y_k$ from the samples $T_k$ of the target sync mark are replaced with multipliers 178$_1$–178$_N$ in FIG. 8. In addition, the comparator 180 detects the sync mark when the correlation 182 exceeds a predetermined upper threshold 184.

An alternative embodiment of the present invention is to detect the maximum correlation over a predefined window of channel sample periods rather than detecting the first correlation to exceed a predetermined threshold. This modification is understood with reference to FIG. 9A and 9B. FIG. 9A is a time line showing the output of the correlator and a predefined SYNC DETECT WINDOW extending from near the end of the preamble, through the sync mark, and including several user data sample values. The sync detector 92 stores the correlations over the sync detect window in a buffer (not shown), and then selects the maximum correlation as the detected sync mark sample period. This improves the fault tolerance by helping to prevent early misdetection of the sync mark, as illustrated in FIG. 9A. The correlation value 185, which exceeds the threshold of comparator 180 in FIG. 8, would not be falsely detected as the sync mark because the next correlation value 187 is the maximum value over the predefined SYNC DETECT WINDOW. FIG. 9B shows the modification to the read channel necessary to implement the sync detect window: a buffer 189 for buffering the channel samples, including the user data samples in the sync detection window, in order to compensate for the added delay in detecting the sync mark. The necessary size of the buffer 189 depends on the length of the sync detection window, but it is possible to derive fairly accurate timing information from the embedded servo wedges 17 of FIG. 1A to allow for a relatively short sync detect window.

Yet another alternative embodiment of the present invention which also helps to prevent early misdetection is to detect a peak in the correlation values of FIG. 9A using a discrete time peak detector, rather than detecting the first correlation to exceed a threshold as in FIG. 8. The peak detector would be qualified by an upper threshold to filter out the peaks before and after the sync mark (i.e., a peak is detected only if it exceeds a predetermined upper threshold). The peak detector embodiment would require an even smaller data buffer 189, if at all. Refer to the above referenced U.S. Pat. No. 5,668,678 for details concerning the preferred embodiment for a discrete time peak detector.

It should be noted that the above sync detection window and peak detection embodiments of the present invention are equally applicable to the least squared sync mark detector shown in FIG. 7. The only difference is that the sync mark detector of FIG. 7 would search for a minimum squared error over the sync detection window, or a minimum peak qualified by a lower threshold.

The sync mark detector of FIG. 8 has the structure of a direct form finite impulse response filter (FIR) with an impulse response matched to the target sync mark. The process of correlating the read signal samples with the samples of the target sync mark is equivalent to convolving the read signal samples with impulse response of the filter $$\text{Corr}(n) = \sum_{k=1}^{N} (h_k \cdot y_{n-k})$$

where $h_k$ are the coefficients of the filter's impulse response and $y_k$ are the read signal sample values. This leads to yet another aspect of the present invention.

Consider, for example, the above target sync mark with EEPR4 samples of (0,0,+1,+3,+3,+1,−1,−3,−3,−1) or (0,0,−1,−3,−3,−1,+1,+3,+3,+1).

The correlation sync mark detector 92 can be implemented as an FIR filter with an impulse response matched to the above samples. The FIR filter may be implemented in direct form, as in FIG. 8, or it may be implemented as shown in FIG. 9A by cascading a first FIR filter 186 having an impulse response of (+1,+3,+3,+1), followed by a NRZI correlator 188 having an impulse response of (+1,0,0,0,−1), followed by a polarity reversing circuit 190 for reversing the polarity of the impulse response depending on the polarity of the above target sync mark.

In the preferred embodiment, the read channel processes two channel samples at a time, that is, the sampling device 24 of FIG. 3 outputs an even and odd sequence of channel samples that are processed in parallel by the downstream discrete time circuitry. In order for the correlator of FIG. 9A to process two samples at a time, it is modified as shown in FIG. 9B. The circuitry of FIG. 9B operates the same as that of FIG. 9A, except that two samples are processed at a time, one from the even $EEPR4_0$ sequence and one form the odd $EEPR4_1$ sequence. Thus, FIG. 9B comprises an even and odd FIR filter with an impulse response of (+1,+3,+3,+1) followed by an even and odd NRZI correlator with impulse response (+1,0,0,0,−1). Each output, labeled EVEN and ODD, represents the even and odd interleaves of the above correlation (i.e., Corr(n) for n even and odd).

Because the sync mark can be detected only when the counter 144 of FIG. 6B is in the appropriate state (i.e., in two of the four possible states) as described above, only the even interleave of the correlator in FIG. 9B need be implemented, the circuitry connected by solid lines. The correlator would be disabled for the odd correlations (when n in Corr(n) is odd), therefore the correlator can be simplified by omitting the odd interleave in FIG. 9B, the circuitry connected by dashed lines. This cost reduced embodiment of the present invention is shown in FIG. 10.

Figure 10A:
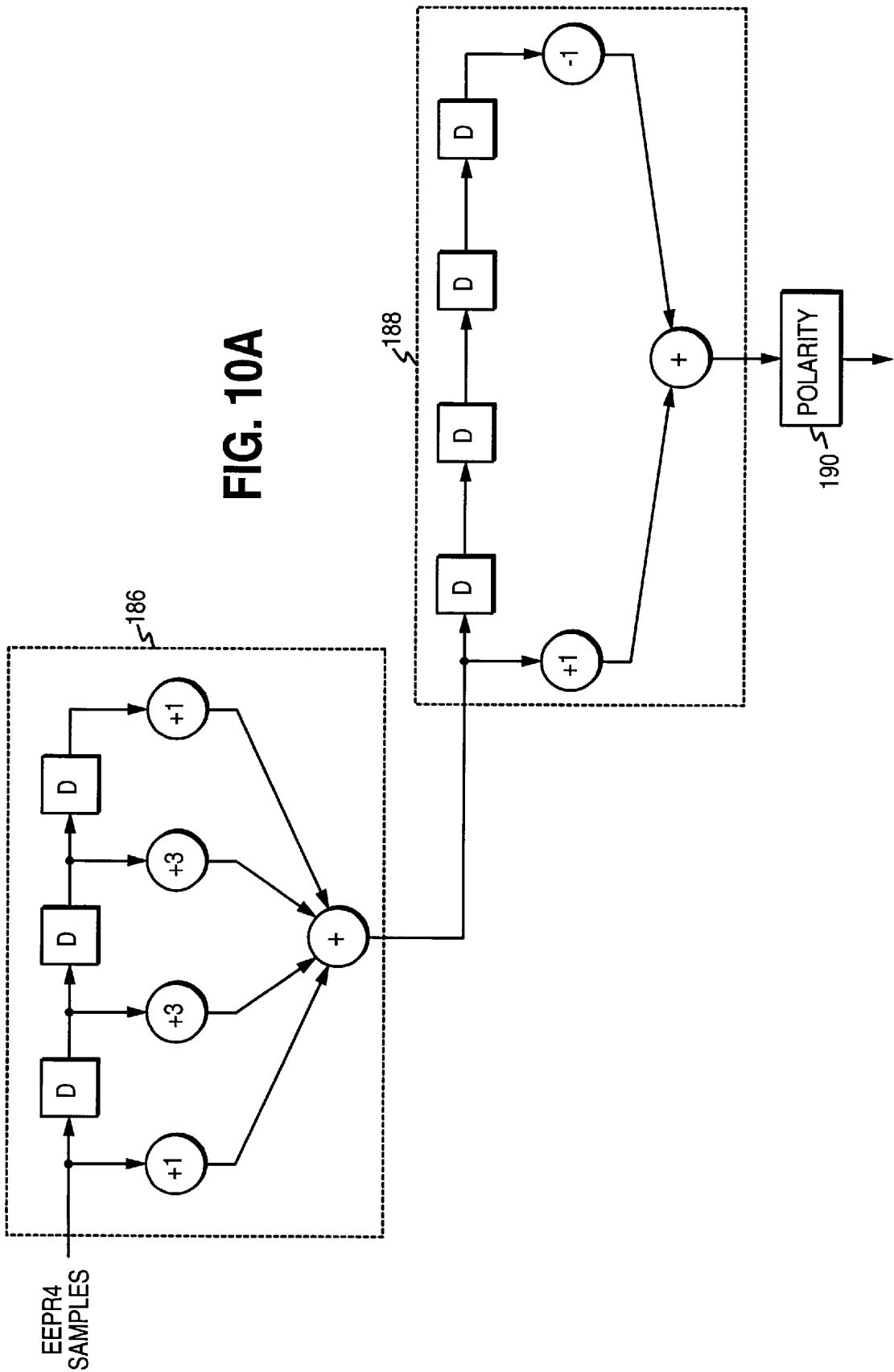
FIG. 10A shows the correlation sync mark detector of the present invention implemented as a (+1,+3,+3,+1) FIR filter cascaded with a (+1,0,0,0,-1) FIR filter for detecting a signed sync mark comprising magnetic transitions of [0,0,+1,0,0,0,-1,0,0,0].
Figure 10B:
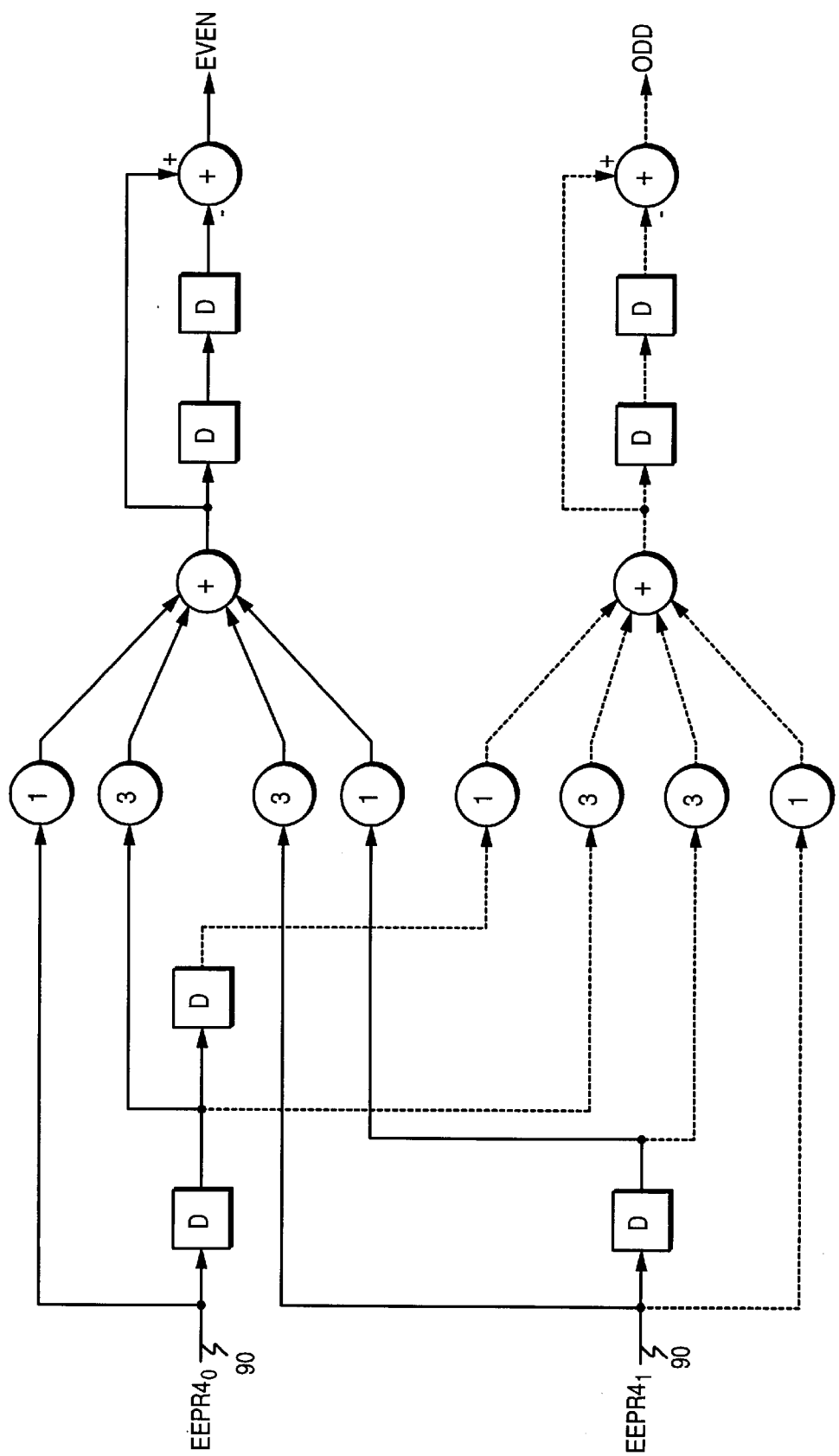
FIG. 10B shows the same correlation sync mark detector of FIG. 9A for processing two channel samples at a time (i.e., even and odd channel subsequences), and outputting EVEN and ODD subsequences of the resulting convolution/correlation.
Figure 11:
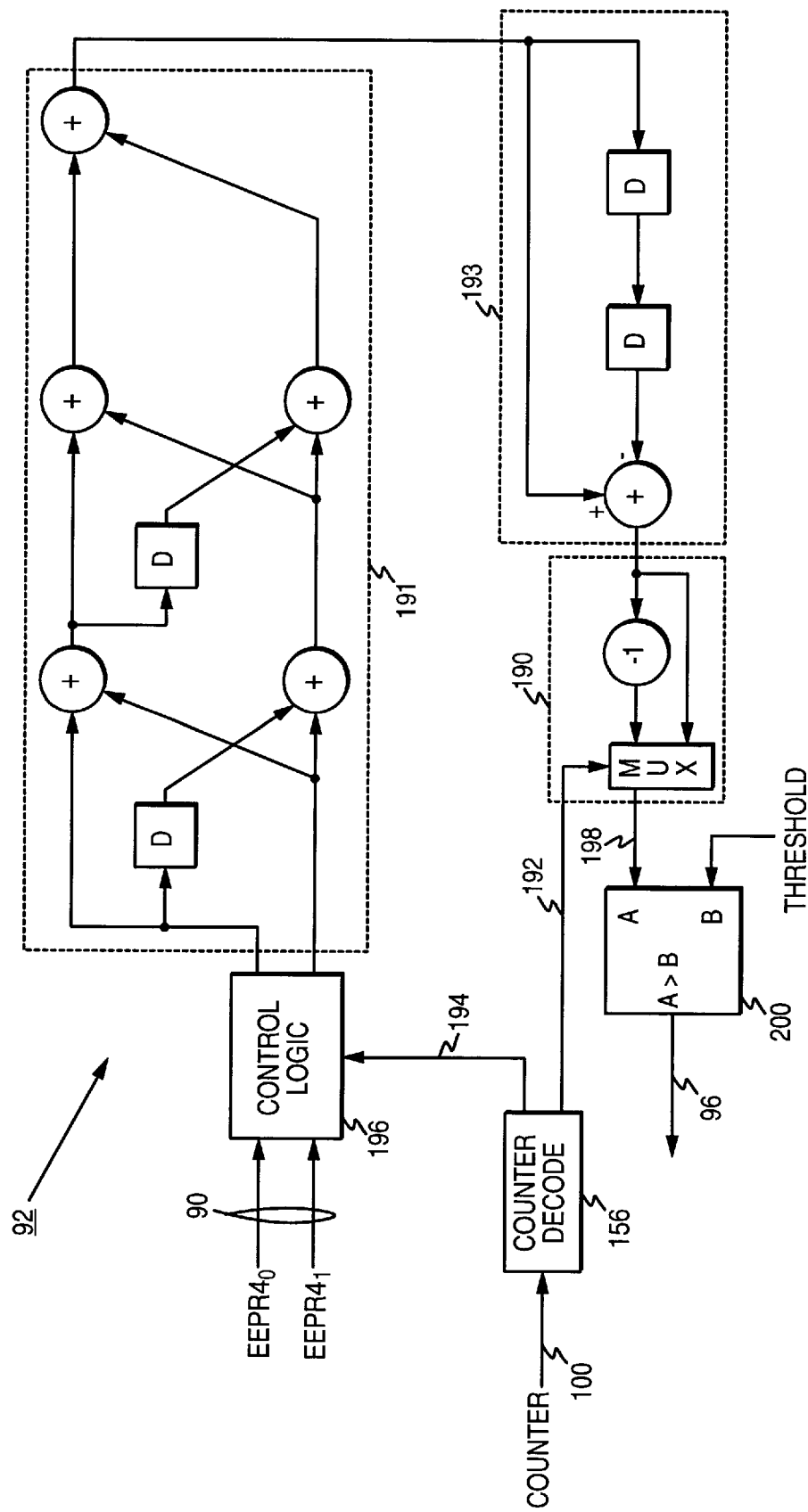
FIG. 11 shows a cost reduced correlation sync mark detector that implements only one of the convolution/correlation interleaves of FIG. 9B, a modification made possible by recording and detecting the acquisition preamble in a manner that ensures the sync mark can only occur in one interleave.

In FIG. 10, the even interleave of the convolution/correlation is implemented by an even interleave (+1,+3,+3,+1) FIR filter 191 followed by an even interleave (+1,0,0,0,−1) NRZI correlator 193. Counter decode circuit 156 generates a first control signal 192 for selecting the appropriate polarity at the output of the cascaded FIR filters depending on the current phase of the acquisition preamble. The counter decode circuit 156 also generates a second control signal 194 applied to control logic 196 which delays loading the EEPR4 channel samples 90 into the first FIR filter 191 until the counter 144 of FIG. 6B is in a state corresponding to the end of the acquisition preamble as described above. Alternatively, the ZPR circuit 124 of FIG. 4 can be implemented to load the channel samples into the appropriate interleaves depending on the initial state of the counter 144. The polarity control signal 192 inverts the polarity of the filter output if the counter 144 control signal 100 indicates the acquisition preamble ends with two positive sample values (i.e., if the first magnetic transition of the sync mark is negative). The output 198 of the polarity circuit 190 is compared to an upper threshold at comparator 200; the sync mark is detected if the correlation exceeds the upper threshold.

Although the embodiment of FIG. 10 omits the odd interleave of the convolution/correlation, in general the present invention decimates the convolution/correlation relative to the frequency of the acquisition preamble. Decimating the convolution/correlation by two is specific to the case where the sync mark can be detected only during every other sample interval. If the sync mark could occur, for example, only during every fourth sample interval, then the convolution/correlation would be decimated by four, which may lead to further simplification of the FIR circuitry.

Another advantage of the correlator shown in FIG. 10 is that it avoids the multipliers and squarers required in the previously described embodiments shown in FIG. 7 and FIG. 8. Furthermore, computer simulations have demonstrated that the correlation sync mark detector of the present invention exhibits excellent performance in detecting short sync marks (such as the above 10-bit sync mark), especially at higher channel densities. Still further, if the target sync mark is d.c. free, then the correlation sync mark detector is insensitive to d.c. offsets in the read signal. For these reasons, the correlation sync mark detector shown in FIG. 10 is the preferred embodiment of the present invention.

Many changes in form and detail could be made without departing from the essential function; the particular embodiments disclosed herein are not intended to be limiting. For example, the particular trellis code employed is not significant; the present invention is applicable to any time varying sequence detector that must be synchronized to the channel samples. Further, detecting the sync mark in the EEPR4 signal space is not a necessary limitation; the aspects of the present invention are equally applicable to other signal spaces, such as PR4 and EPR4. Therefore, the scope of the invention should be construed from the limitations set forth in the claims that follow.

We claim:

1. A sampled amplitude read channel for reading data from a magnetic medium by detecting digital data from a sequence of discrete time sample values generated by sampling pulses in an analog read signal from a magnetic read head positioned over the magnetic medium, comprising:
   (a) a sampling device for generating the sequence of discrete time sample values;
   (b) a sync mark detector for detecting a recorded sync mark by comparing a magnitude and sign of the discrete time sample values to a magnitude and sign of target sample values of a target sync mark; and
   (c) a discrete time sequence detector, responsive to the discrete time sample values, for detecting the digital data.

2. The sampled amplitude read channel as recited in claim 1, wherein the sync mark detector computes a squared error between a discrete time sample value and a target sample value.

3. The sampled amplitude read channel as recited in claim 2, wherein the sync mark detector comprises:
   (a) a squarer for squaring the sample error to generate a squared sample error;
   (b) an accumulator for accumulating the squared sample errors to generate a final squared error value; and
   (c) a comparator for comparing a the final squared error value to a predetermined threshold.

4. The sampled amplitude read channel as recited in claim 3, wherein the sync mark detector detects the recorded sync mark when the final squared error value is less than the threshold.

5. The sampled amplitude read channel as recited in claim 1, wherein the sync mark detector computes a correlation between the discrete time sample values and the target sample values.

6. The sampled amplitude read channel as recited in claim 5, wherein the sync mark detector comprises:
   (a) a plurality of multipliers for multiplying the discrete time sample values with corresponding target sample values to generate correlated sample values;
   (b) an accumulator for accumulating the correlated sample values to generate a final correlation value; and
   (c) a comparator for comparing a the final correlation value to a predetermined threshold.

7. The sampled amplitude read channel as recited in claim 6, wherein the sync mark-detector detects the recorded sync mark when the final correlation value is greater than the threshold.

8. The sampled amplitude read channel as recited in claim 5, wherein the sync mark detector comprises a finite impulse response (FIR) filter.

9. The sampled amplitude read channel as recited in claim 8, wherein the sync mark detector comprises a first and second FIR filters connected in series.

10. The sampled amplitude read channel as recited in claim 8, wherein the FIR filter implements a decimated convolution of the discrete time sample values with the target sample values.

11. The sampled amplitude read channel as recited in claim 1, further comprising a discrete time equalizer for equalizing the discrete time sample values according to a partial response to generate equalized sample values, wherein the sync mark detector is responsive to the equalized sample values.

12. The sampled amplitude read channel as recited in claim 11, wherein the partial response is selected from the group consisting of PR4, EPR4 and EEPR4.

13. The sampled amplitude read channel as recited in claim 1, wherein:
   (a) the discrete time sequence detector operates according to a time varying trellis state machine; and
   (b) the sync mark detector generates a control signal for synchronizing the time varying trellis state machine to the discrete time sample values.

14. The sampled amplitude read channel as recited in claim 13, wherein the trellis state machine changes structure at data indices k modulo N=C, where k is a data index, N is an integer greater than one, and C is an integer.

15. The sampled amplitude read channel as recited in claim 1, wherein:
   (a) the digital data comprises an acquisition preamble for synchronizing a timing recovery circuit; and
   (b) the sync mark detector is responsive to a control signal generated relative to a frequency of the acquisition preamble.

16. A sampled amplitude read channel for reading data from a magnetic medium by detecting digital data from a sequence of discrete time sample values generated by sampling pulses in an analog read signal from a magnetic read head positioned over the magnetic medium, comprising:
   (a) a sampling device for generating the sequence of discrete time sample values;
   (b) a sync mark detector for detecting a recorded sync mark by computing a squared error between the discrete time sample values and target sample values of a target sync mark; and
   (c) a discrete time sequence detector, responsive to the discrete time sample values, for detecting the digital data.

17. The sampled amplitude read channel as recited in claim 16, wherein:
   (a) the discrete time sequence detector operates according to a time varying trellis state machine; and
   (b) the sync mark detector generates a control signal for synchronizing the time varying trellis state machine to the discrete time sample values.

18. The sampled amplitude read channel as recited in claim 17, wherein the trellis state machine changes structure at data indices k modulo N=C, where k is a data index, N is an integer greater than one, and C is an integer.

19. The sampled amplitude read channel as recited in claim 16, wherein:

(a) the digital data comprises an acquisition preamble for synchronizing a timing recovery circuit; and (b) the sync mark detector is responsive to a control signal generated relative to a frequency of the acquisition preamble.

20. A sampled amplitude read channel for reading data from a magnetic medium by detecting digital data from a sequence of discrete time sample values generated by sampling pulses in an analog read signal from a magnetic read head positioned over the magnetic medium, comprising:

(a) a sampling device for generating the sequence of discrete time sample values;

(b) a sync mark detector for detecting a recorded sync mark by computing a correlation between the discrete time sample values and target sample values of a target sync mark; and (c) a discrete time sequence detector, responsive to the discrete time sample values, for detecting the digital data.

21. The sampled amplitude read channel as recited in claim 20, wherein:

(a) the discrete time sequence detector operates according to a time varying trellis state machine; and (b) the sync mark detector generates a control signal for synchronizing the time varying trellis state machine to the discrete time sample values.

22. The sampled amplitude read channel as recited in claim 21, wherein the trellis state machine changes structure at data indices k modulo N=C, where k is a data index, N is an integer greater than one, and C is an integer.

23. The sampled amplitude read channel as recited in claim 20, wherein:

(a) the digital data comprises an acquisition preamble for synchronizing a timing recovery circuit; and (b) the sync mark detector is responsive to a control signal generated relative to a frequency of the acquisition preamble.

24. A sampled amplitude read channel for reading data from a magnetic medium by detecting digital data from a sequence of discrete time sample values generated by sampling pulses in an analog read signal from a magnetic read head positioned over the magnetic medium, comprising:

(a) a sampling device for generating the sequence of discrete time sample values;

(b) a sync mark detector for detecting a recorded sync mark by comparing channel data to a target sync mark, comprising:

(i) a buffer for storing a plurality of the comparisons over a predefined sync detect window, the sync detect window including channel samples of an acquisition preamble and user data samples of a user data field; and (ii) a means for evaluating the plurality of comparisons to determine which comparison most likely indicates a location of the recorded sync mark in the sequence of discrete time sample values; and (a) a discrete time sequence detector, responsive to the discrete time sample values, for detecting the digital data.

25. The sampled amplitude read channel as recited in claim 24, wherein the means for evaluating searches for a minimum squared error between the channel data and the target sync mark.

26. The sampled amplitude read channel as recited in claim 24, wherein the means for evaluating searches for a maximum correlation between the channel data and the target sync mark.

27. A sampled amplitude read channel for reading data from a magnetic medium by detecting digital data from a sequence of discrete time sample values generated by sampling pulses in an analog read signal from a magnetic read head positioned over the magnetic medium, comprising:

(a) a sampling device for generating the sequence of discrete time sample values;

(b) a sync mark detector for detecting a recorded sync mark by comparing channel data to a target sync mark, comprising a peak detector for detecting a peak in a plurality of the comparisons to determine which comparison most likely indicates a location of the recorded sync mark in the sequence of discrete time sample values; and (c) a discrete time sequence detector, responsive to the discrete time sample values, for detecting the digital data.

28. The sampled amplitude read channel as recited in claim 27, wherein the peak detector searches for a minimum peak in a plurality of squared errors between the channel data and the target sync mark.

29. The sampled amplitude read channel as recited in claim 27, wherein the peak detector searches for a maximum peak in a plurality of correlations between the channel data and the target sync mark.

30. The sampled amplitude read channel as recited in claim 27, wherein the peak detector is qualified by a predetermined threshold.

* * * * *